(12) United States Patent
Baker (10) Patent No.: US 6,377,612 B1
(45) Date of Patent: Apr. 23, 2002

(54) WIRELESS REPEATER USING POLARIZATION DIVERSITY IN A WIRELESS COMMUNICATIONS SYSTEM

(75) Inventor: Kenneth R. Baker, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/126,692

(22) Filed: Jul. 30, 1998

(51) Int. Cl.[7] .......................... H04B 1/707; H04L 25/60
(52) U.S. Cl. ...................... 375/141; 375/214; 455/101; 342/361
(58) Field of Search ................................. 375/211, 214, 375/141; 370/315, 320, 317; 455/7, 11.1, 22, 101, 103, 15, 25; 342/360, 361

(56) References Cited

U.S. PATENT DOCUMENTS

| | | | | |
|---|---|---|---|---|
| 5,860,057 A | * | 1/1999 | Ishida et al. | 370/317 |
| 6,101,385 A | * | 8/2000 | Monte et al. | 455/427 |
| 6,125,109 A | * | 9/2000 | Fuerter | 370/315 |

* cited by examiner

*Primary Examiner*—Don N. Vo
(74) *Attorney, Agent, or Firm*—R. Ben Miller; Christopher Edwards (57) ABSTRACT

The invention includes methods and systems to improve the signal diversity between a repeater and a base station in a wireless communication system. A communications device transmits a wireless signal. The repeater receives two versions of the wireless signal using a first receiver system and a second receiver system. The repeater transmits two versions of the wireless signal that correspond to the two received versions. The repeater transmits the two versions with different signal polarizations so they can be isolated from one another at the base station. The base station receives the two versions from the repeater and isolates each version based on the difference in polarization. The base station processes the two diverse versions to produce a high-quality signal. The use of different polarizations to provide diverse signals between the repeater and the base station lowers signal power requirements and increases the capacity of CDMA systems.

22 Claims, 7 Drawing Sheets

WIRELESS REPEATER USING POLARIZATION DIVERSITY IN A WIRELESS COMMUNICATIONS SYSTEM

BACKGROUND OF THE INVENTION

I. Field of the Invention

The present invention relates to the field of wireless communications. More particularly, the present invention relates to a novel and improved system for using different wireless signal polarizations to maintain diversity between a repeater and a base station.

II. Description of the Related Art

Wireless communication entails the transmission of electromagnetic waves through free space. In a wireless communications system, a base station receives a wireless signal from a communications device, such as a mobile phone. Some base stations receive diverse versions of the wireless signal by using two antennas. This technique is referred to as receive diversity. Receive diversity improves system performance because one version of the signal may still be available if the other version of the signal fades.

A wireless repeater is sometimes used between the communications device and the base station. The repeater extends the range of the base station by amplifying and re-transmitting the wireless signal between the communications device and the base station. Some repeaters also use receive diversity by receiving two versions of the wireless signal from the communications device. The repeater sums the two versions into a combined signal and transmits the combined wireless signal to the base station.

The current repeater solution is lacking. If the transmitter malfunctions, the wireless signal from the repeater is lost or flawed and user communications are disrupted. The summing of the two versions of the wireless signal in the repeater degrades the Signal-to-Noise Ratio (SNR) by at least three decibels in low SNR conditions. In addition, system performance suffers because the ability to isolate the diverse versions is lost after they are summed. Even if the base station also has receive diversity, each base station antenna will receive the combined wireless signal, and not the original diverse versions received by the repeater.

Multipath signals are different versions of the same wireless signal that are generated by reflections from structures and natural formations. Multipath signals can have phase shifts that cause the signals to cancel each other out at certain locations. The loss of a signal due to the phase cancellation of multipath signals is known as fading. Fading is a serious problem in wireless systems because it disrupts user communications. For example, several multipath copies of a single wireless signal transmitted by a wireless communications device may be generated by reflections from trees and buildings. These multipath copies may combine in the base station and cancel each other out due to phase offset.

The loss of diversity in the repeater has an impact on wireless systems that use Code Division Multiple Access (CDMA). One form of CDMA is specified in the IS-95 standard approved by the Telecommunications Industry Association, but the invention is not restricted to the form of CDMA specified in this particular standard. CDMA systems transmit and receive wireless signals within a single frequency band and use codes to separate the individual signals. In contrast, other systems use frequency and time division to separate the individual signals. CDMA systems have demonstrated clear advantages in the areas of capacity, voice quality, privacy, and cell hand-off.

CDMA systems require power control. The SNR represents the power of a signal relative to the surrounding noise. An adequate SNR must be maintained so that the signal can be separated from the noise. Since CDMA signals are not divided by frequency for time a given link direction, the noise component of the ratio includes all other received CDMA signals. If the power of an individual CDMA signal is too high, it effectively drowns out all other CDMA signals. Thus, power control is used to maintain an equivalent power level for all user signals received at the base station. The power level of these received CDMA signals should be minimized, but still must be strong enough to maintain the appropriate SNR. CDMA systems dynamically control the transmit power of each communications device to maintain the appropriate power level of the received signals at the base station. Dynamic control is applied through open loop and closed loop control techniques that are known in the industry.

The range of the CDMA system is directly related to the common power level of the received signals because each additional signal adds noise to all of the other signals. The user noise component of the SNR is reduced when the average receive power level is lowered. Techniques that decrease CDMA signal power from the communications device directly increase the range of the CDMA system. Receive diversity is one technique used to minimize the required signal power. Lower signal power also lowers the cost of the user communications devices while increasing operational battery life as well as the range.

Unlike other wireless systems, CDMA systems can process multipath signals to provide additional diversity. Unfortunately, multipath signals that are not separated by a sufficient time delay may still cause fading in a CDMA system. Signal power is typically increased to overcome fading, but the increased signal power reduces the range of the system.

Prior CDMA systems have used receive diversity at the repeater and base stations. Unfortunately, the diversity is lost in the repeater because the diverse versions of the signal are summed. This loss of diversity increases the signal power requirement and decreases the range of the CDMA system. The performance of any wireless communications system could be improved if the receive diversity of the repeater is maintained through to the base station. For CDMA systems, the range of the systems can be increased if the signal power can be reduced through improved diversity.

Polarization is a known characteristic of electromagnetic radiation. Polarization refers to electrical field vectors that are perpendicular to the direction of electromagnetic wave propagation. For wireless signals, the polarization vectors are typically linear or circular or, in general, elliptical when viewed in the time domain. For circular and elliptical polarization, the electric field vector traces a circle or, in general, an ellipse in the time domain as the wave propagates. The direction of rotation can be either right-hand or left-hand relative to the direction of propagation. Thus, two common forms of polarization are right-hand circular and left-hand circular. Linear polarization vectors are static in the time domain. Linear polarization vectors are further characterized as horizontal, vertical, right-slant, or left-slant. The vectors in horizontal and vertical polarization are aligned with the horizontal and vertical axis respectively. The right-slant and left-slant are offset from the vertical to the right and left respectively. Thus, two more common forms of polarization are linear right-slant and linear left-slant.

Two signals have orthogonal polarization states if one polarization state contains no components of the other polarization state. Orthogonal polarization is easy to visualize with linear states. Horizontal and vertical states are orthogonal. Linear states at tilt angles of 45 degrees and 135 degrees are also orthogonal. The simplest representation for visualizing orthogonal wave states is the Poincaré Sphere. Those knowledgeable in the art, specifically in the mathematics of electromagnetic wave polarization, understand that every possible polarization state for a completely polarized wave can be assigned to a point on the surface of the Poincaré Sphere. Polarization states are orthogonal if represented by opposite points on the Poincaré Sphere. Polarization is discussed further in Polarization in Electromagnetic Systems by Warren L. Stutzman, published by Artech House, Norwood, Me., 1993, and ISBN 0-89006-508-X; and in Satelite Communications by Timothy Pratt and Charles W. Bostian, published by John Wiley and Sons, New York, N.Y., 1986 and ISBN 0-471-87837-5.

Some proposed satellite systems transmit microwave signals that use different signal polarizations for different groups of users. The proposed system does not use different signal polarizations to provide signal diversity for the same user. The use of different signal polarizations has not been extended to the link between a wireless repeater and a wireless base station to provide diverse versions of the same wireless signal.

SUMMARY OF THE INVENTION

The present invention is a novel and improved system that maintains receive diversity between the wireless repeater and the wireless base station. The repeater does not sum the diverse versions of the wireless signal, but transmits them to the base station using diverse signal polarities. The base station uses the diverse polarities to receive and isolate the diverse versions of the wireless signal and maintain the receive diversity of the repeater.

The use of diversely polarized wireless signals improves overall system diversity between the repeater and base station. The improved diversity lowers signal power requirements and increases the capacity and range of wireless base stations that use CDMA. The diversely polarized versions of the wireless signal can be isolated so that processing of the diversity signals in the base station is optimized. In addition to these advantages, the repeater does not incur the three-decibel SNR loss because it does not sum the diverse versions of the signal. Also, reduced transmit power at the user communications device lowers the cost of the device while increasing operational battery life and range.

The invention includes methods and systems for use in a wireless communications system where a communications device transmits a wireless signal. A repeater system receives a first version of the wireless signal using a first receiver system and receives a second version of the wireless signal using a second receiver system. The repeater system transmits a third version of the wireless signal that has a first polarization and that is based on the first version of the wireless signal. The repeater system transmits a fourth version of the wireless signal that has a second polarization and that is based on the second version of the wireless signal.

A base station system receives the third version of the wireless signal using the first polarization and receives the fourth version of the wireless signal using the second polarization. The base station system receives the third version of the wireless signal and the fourth version of the wireless signal and processes these versions in the conventional manner. The base station may also concurrently process signals from other communications devices that do not use the repeater system.

In some embodiments of the invention, the wireless signal is a CDMA signal. The first polarization and the second polarization could be orthogonal to one another, such as linear right-slant and linear left-slant that are off-set by 45 degrees from the vertical. The first polarization and the second polarization could alternatively be right-hand circular and left-hand circular respectively. The repeater's two transmitter systems could be comprised of a single antenna structure that has two distinct polarization characteristics, and the base station's two receiver systems could also be comprised of a single antenna structure that has the same two distinct polarization characteristics.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Underlying Technology—FIGS. 1–4

Figure 1:
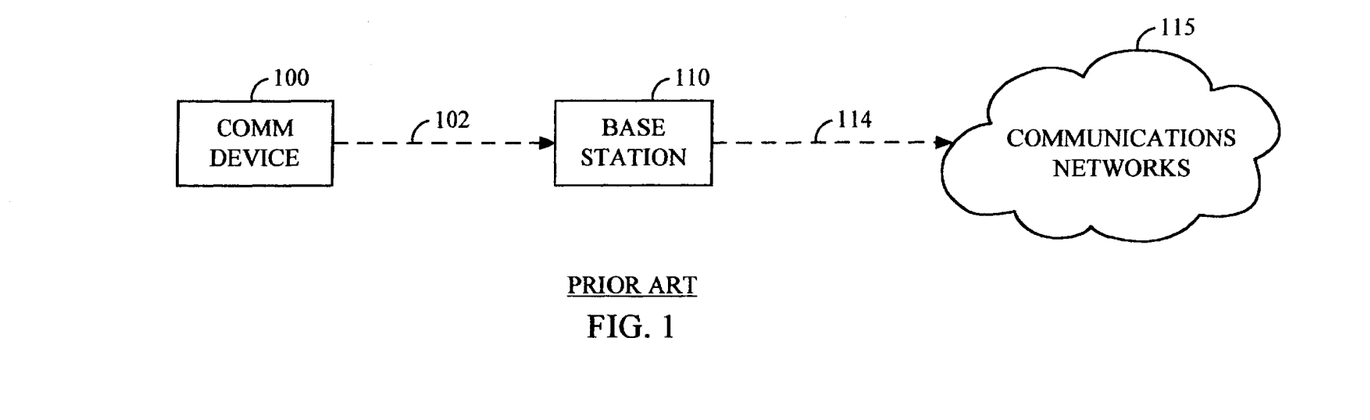
FIG. 1 is a block diagram of a conventional wireless system with a base station.

FIG. 1 depicts a basic wireless system that is known in the art. A communications device 100, such as a wireless telephone or a wireless data terminal, transmits a wireless signal 102 containing user information to a base station 110. The base station 110 processes the wireless signal 102 and transmits a signal 114 to communications networks 115. The signal 114 is based on the wireless signal 102.

The communications link from the communications device 100 to the base station system 110 is referred to as the reverse link. The communications link from the base station system 110 to the communications device 100 is referred to as the forward link. Communications occur on the forward link in a reciprocal fashion from the communications networks 115 to the communications device 100 through the base station 110.

In a typical system, several base stations are deployed to allow numerous mobile users to communicate with the base stations as they travel. The communications networks 115 would typically include a base station controller or similar device that exchanges communications with multiple base stations. Examples of the communications networks 115 include public switched networks, wireless networks, satellite networks, long distance telephone networks, local telephone networks, and the Internet.

Figure 2:
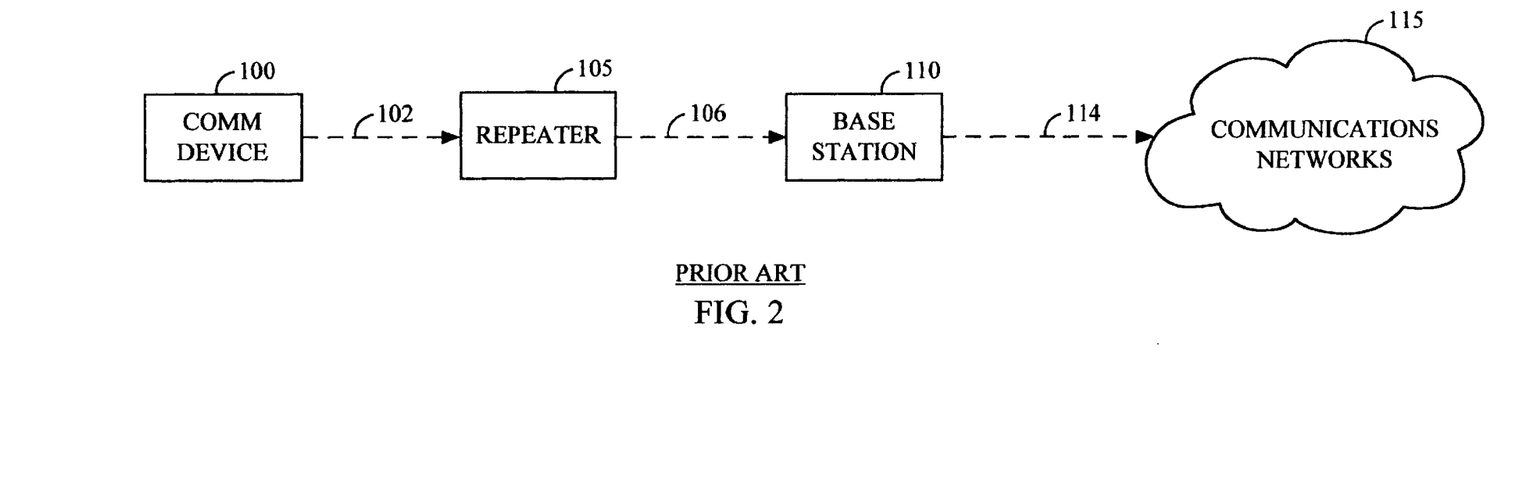
FIG. 2 is a block diagram of a conventional wireless system with a repeater and a base station.

FIG. 2 depicts the system of FIG. 1 with a repeater 105 added in between the communications device 100 and the base station 110. The repeater 105 receives the wireless signal 102. The repeater 105 amplifies the received signal and transmits a wireless signal 106 that is based on the amplified signal to the base station 110. The repeater 105 extends the range of the base station 110. Although not shown, the base station 110 would typically receive wireless signals from other communications devices without using the repeater 105.

Figure 3:
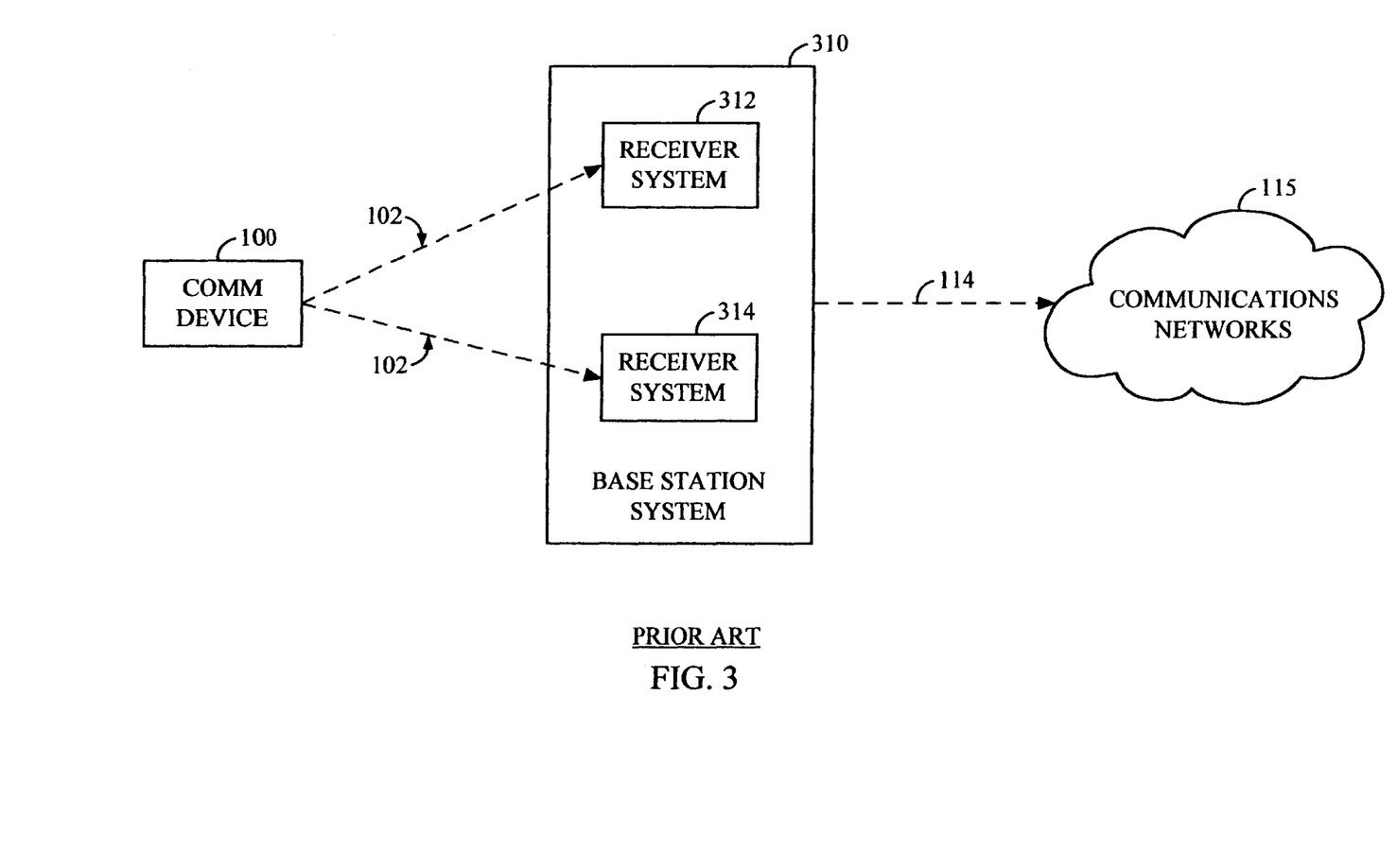
FIG. 3 is a block diagram of a conventional wireless system with receive diversity at the base station.

FIG. 3 depicts the current use of receive diversity at a base station 310. The communications device 100 transmits the wireless signal 102 to a base station 310. The wireless signal 102 is shown as two dashed lines for clarity, but those skilled in the art are aware that wireless signals typically propagate in a directional or omni-directional manner. The dashed lines represent the versions of the wireless signal 102 that are received by the base station 310. The base station 310 includes a first receiver system 312 and a second receiver system 314. The receiver systems 312 and 314 each receive a version of the wireless signal 102 from the communications device 100. Typically, the versions of the wireless signal 102 are different due to the different physical path taken by each version, and each version is comprised of related multi-path copies. The base station 310 processes the versions of the wireless signal and transfers the resulting communications signal 114 to the communications networks 115.

Figure 4:
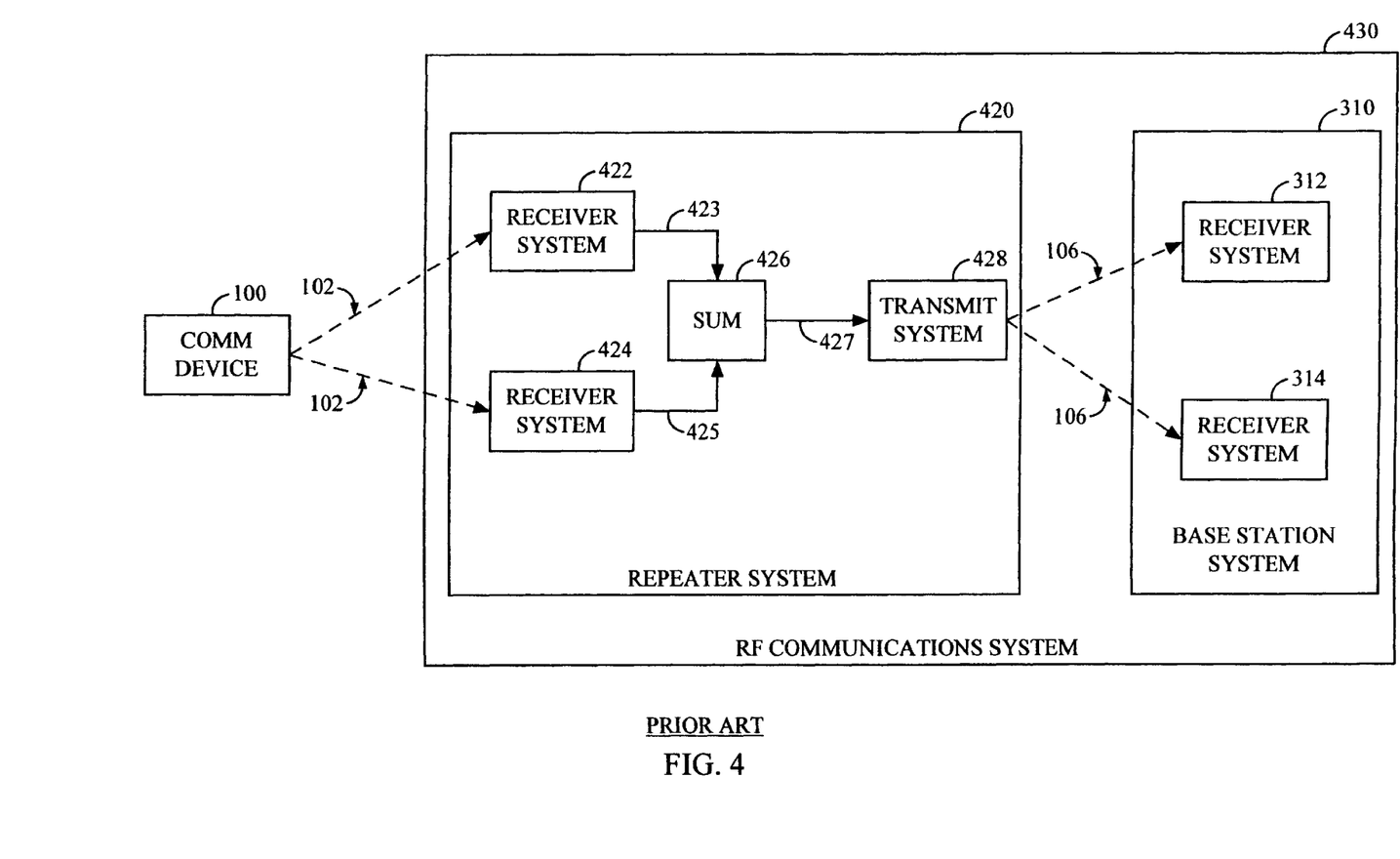
FIG. 4 is a block diagram of a conventional wireless system with receive diversity at the repeater.

FIG. 4 depicts the current use of receive diversity at a repeater system 420 and the base station 310. The communications device 100 transmits the wireless signal 102 to the repeater system 420. The repeater system 420 uses a receiver system 422 to receive a version 423 of the wireless signal 102 and uses a receiver system 424 to receive a version 425 of the wireless signal 102. The receiver systems 422 and 424 transfer the versions 423 and 425 of the wireless signal 102 to a summing circuit 426. The summing circuit 426 sums the versions 423 and 425 to create a resulting signal 427 that is provided to the transmitter system 428. The transmitter system 428 transmits a wireless signal 106 that is based on the resulting signal 427. The summing circuit 426 can cause a three-decibel loss in the SNR of the resulting signal 427 if the receiver systems 422 and 424 have enough gain.

The base station 310 uses the receiver system 312 and the receiver system 314 to receive two versions of the wireless signal 106. The base station 310 processes the versions of the wireless signal 106 and to generate a resulting communications signal with the user information in the wireless signal 102. It should be noted that the technique of summing the versions 423 and 425 loses much of the diversity attained by the repeater system 420.

Figure 5:
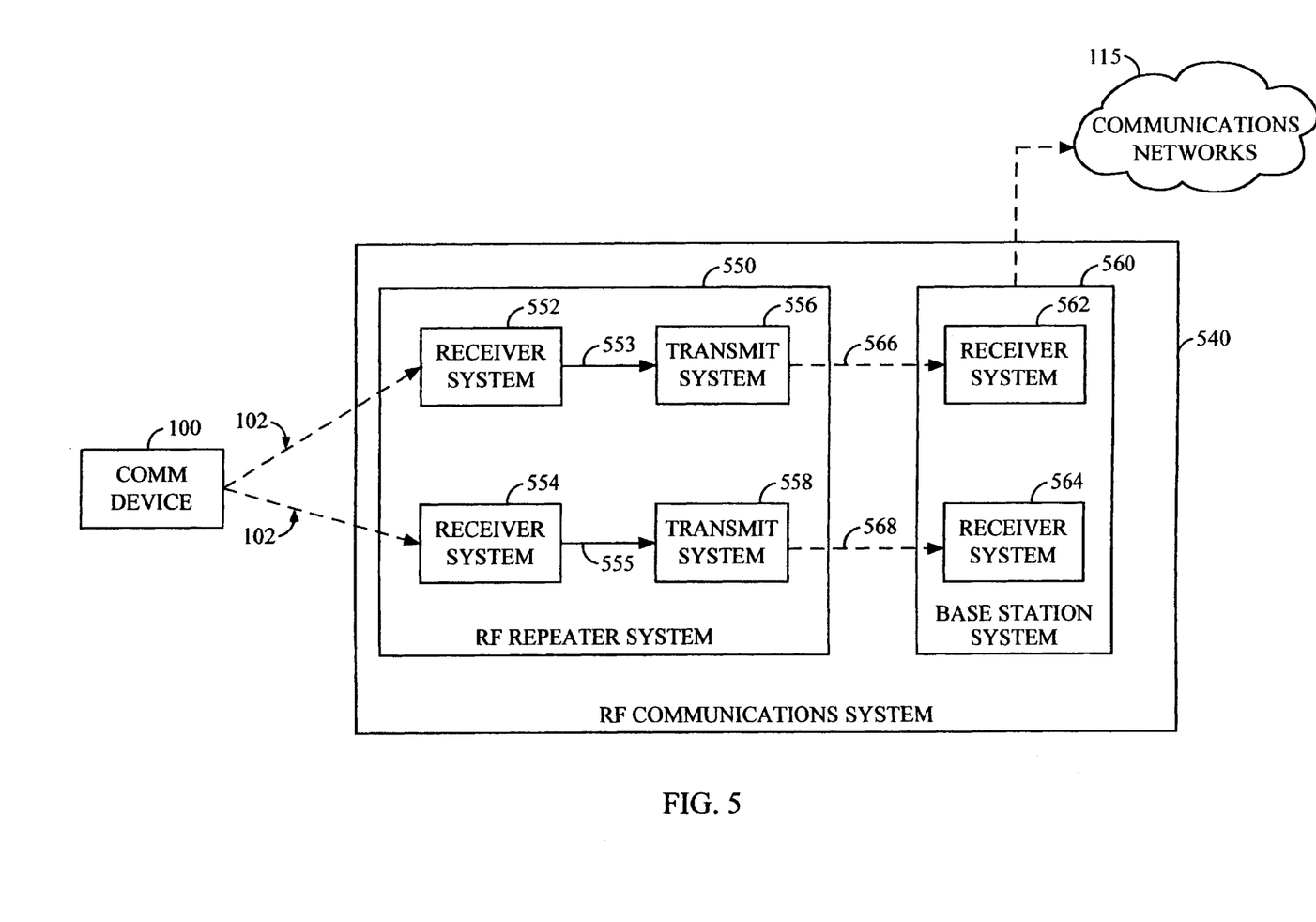
FIG. 5 is a block diagram of a communications system in an embodiment of the invention.

System Configuration and Operation—FIG. 5

FIG. 5 depicts a wireless communications system 540 that is configured and operates in accord with the present invention. The communications device 100 transmits the wireless signal 102 containing user information to the wireless communications system 540. The wireless communications system 540 transfers the communications signal 114 containing the user information to the communications networks 115. The wireless communications system 540 is comprised of a wireless repeater system 550 and a wireless base station system 560. In some embodiments, the wireless communications system 540 uses CDMA.

The communications device 100 could be any device that transmits wireless signals. An example of the communications device 100 is the model QCP-2700 provided by Qualcomm, Inc. of San Diego, Calif.

The wireless repeater system 550 is comprised of a receiver system 552, a receiver system 554, a transmitter system 556, and a transmitter system 558. The meaning of the term "repeater" varies, but in the context of the invention, the term "repeater" means a system that receives, amplifies, and re-transmits a wireless signal without extracting the user information or converting the communications protocol. For example, a CDMA base station receives and decodes CDMA signals to extract user information. The CDMA base station then transmits another signal with the extracted user information. The CDMA base station may use a different protocol, such as a T1, to transmit the other signal. In contrast, a "repeater" does not decode CDMA signals to extract user information and does not change signal protocols.

The repeater system 550 is shown as an integrated device, but in some embodiments of the invention, the repeater system could be comprised of two discreet receiver/transmitter pairs that are configured to operate in accord with the invention. For example, the receiver system 552 and the transmitter system 556 could be housed in a repeater device that is at different physical location from another repeater device containing the receiver system 554 and transmitter system 558. The repeater system 550 could be adapted by those skilled in the art from the model CDR 1901 provided by Ortel, Inc. of Alhambra, Calif.

The base station system 560 is comprised of a receiver system 562 and a receiver system 564. The base station system 560 processes diverse versions 566 and 568 and transfers the resulting communications signal 114 to the communications networks 115. Such processing typically includes down-conversion, demodulation and decoding. The communications signal 114 includes the user information transmitted in the wireless signal 102. An example of the base station system is the model 519e provided by Qualcomm, Inc. of San Diego, Calif.

In operation, the communications device 100 transmits the wireless signal 102 to the repeater system 550. The repeater system 550 receives a version 553 of the wireless signal 102 using the receiver system 552. The repeater system 550 also receives a version 555 of the wireless signal 102 using the receiver system 554. The repeater system 550 transmits a version 566 of the wireless signal 102 to the base station 560. The version 566 is a wireless signal that is based on the version 553 and that has a first polarization. The repeater system 550 also transmits a version 568 of the wireless signal 102 to the base station 560. The version 568 is a wireless signal that is based on the version 555 and has a second polarization.

The first polarization used in the version 566 is different from the second polarization used in the version 568. The version 566 and the version 568 can be isolated from one another based on the first polarization and the second polarization. For optimum operation, the polarizations used by versions 566 and 568 form an orthogonal pair. Those skilled in the art are aware that perfect control over polarization to provide purely orthogonal signals is not generally attainable in practice. The term "orthogonal" is defined to include these minor deviations from purely orthogonal signals that are generally accepted in practice for orthogonal polarization.

The base station system 560 receives the version 566 of the wireless signal 102 using the receiver system 562. The receiver system 562 uses the first polarization to receive and isolate the version 566 from the version 568. The base station system 560 also receives the version 568 of the wireless signal 102 using the receiver system 564. The receiver system 564 uses the second polarization to receive and isolate the version 568 from the version 566. The base station system 560 processes the version 566 and version 568 to generate a communications signal 114 with the user information carried in the wireless signal 102. The base station system 560 typically transfers the communications signal 114 to the communications networks 115.

The base station 560 may also receive other wireless signals from other communications devices (not shown) that do not use the repeater. The use of diversely polarized receiver systems 562 and 564 provides these other communications devices with receive diversity as well. If it is desired that a communications device should not communicate directly with the base station 560, the base station 560 can be configured to transmit and receive using a polarization that is different from that used by the communications device.

Figure 6:
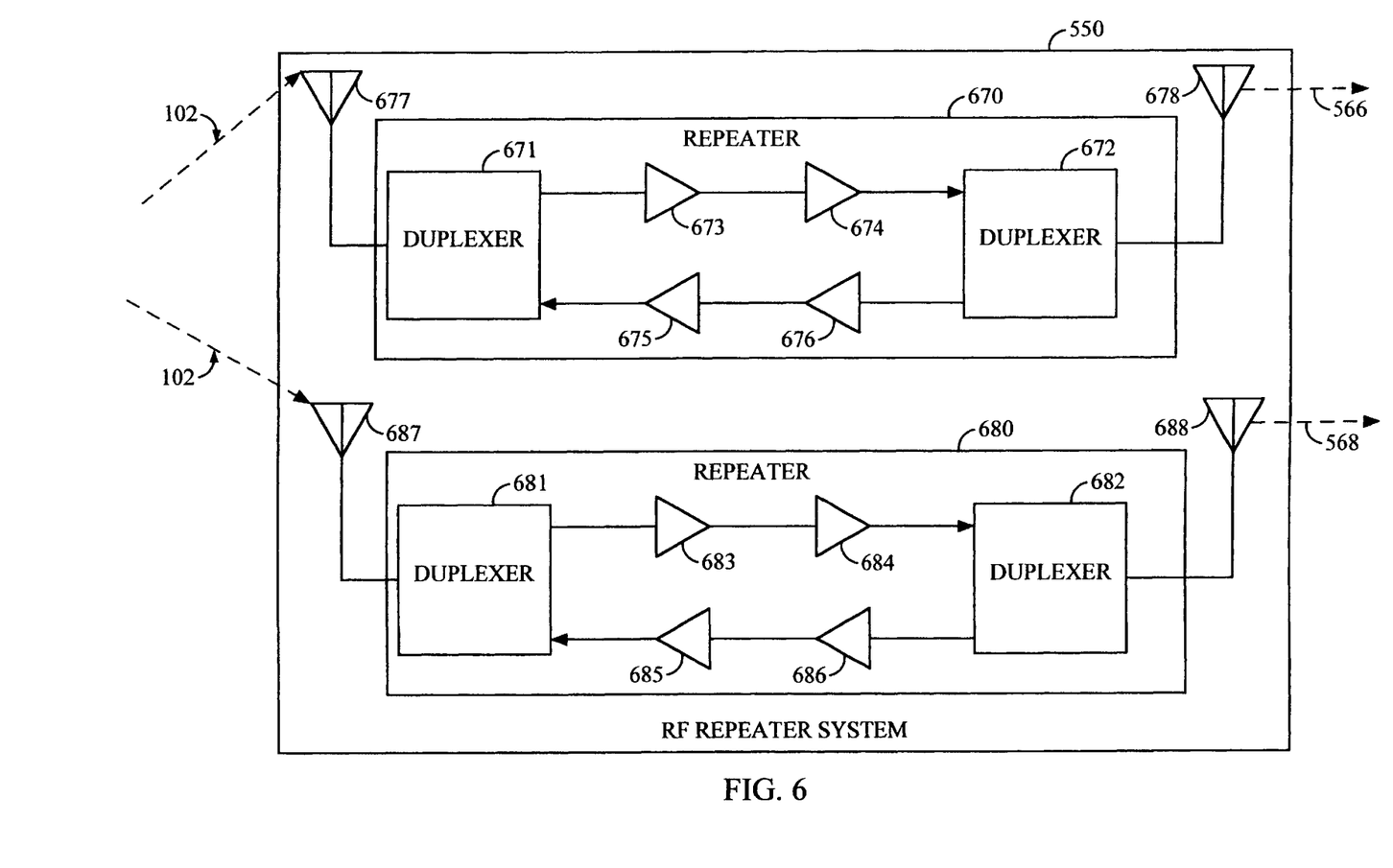
FIG. 6 is a block diagram of a repeater system in an embodiment of the invention.

The Repeater System—FIG. 6

FIG. 6 depicts the repeater system 550. The repeater system 550 is comprised of a repeater 670 and a repeater 680. The repeater 670 is comprised of a duplexer 671, a duplexer 672, a low-noise amplifier 673, a power amplifier 674, a power amplifier 675, and a low-noise amplifier 676. Antennas 677 and 678 are coupled to the duplexers 671 and 672 respectively. The repeater 680 is comprised of a duplexer 681, a duplexer 682, a low-noise amplifier 683, a power amplifier 684, a power amplifier 685, and a low-noise amplifier 686. Antennas 687 and 688 are coupled to the duplexers 681 and 672 respectively.

Those skilled in the art are aware that there are numerous other components and configurations that could be used for the repeater system of the present invention and that the invention is not restricted to the components and configuration depicted on FIG. 6. For example, modulation circuitry and a surface accoustic wave filter are typically used to convert the signal to an intermediate frequency and remove undesired out-of-band components before conversion back to the radio frequency for transmission. In addition, two forward links are shown in the repeater system 550 with one in each repeater 670 and 680, but only a single forward link could be used in the repeater system 550 without departing from the scope of the invention.

The antennas, duplexers, and amplifiers that are shown on FIG. 6 are conventional components, although they have not been combined to operate in accord with the invention. The receiver system 552 of FIG. 5 could correspond to the antenna 677, the duplexer 671, and the low-noise amplifier 673. The transmitter system 556 of FIG. 5 could correspond to the power amplifier 674, the duplexer 672, and the antenna 678. The version 553 of the wireless signal 102 of FIG. 5 could correspond to the signal between the low-noise amplifier 673 and the power amplifier 674. The receive system 554, version 555, and transmitter system 558 of FIG. 5 could correspond to elements of FIG. 6 in a similar fashion. If desired, the antennas 678 and 688 could be integrated into a single antenna structure with two distinct polarization characteristics.

In operation, the antenna 677 receives the wireless signal 102 and transfers the received signal to the duplexer 671. The duplexer 671 transfers the received signal from the antenna 677 to the low-noise amplifier 673. The low-noise amplifier 673 amplifies the signal from the duplexer 671 and transfers the signal to the power amplifier 674. The power amplifier 674 amplifies the signal from the low-noise amplifier 673 and transfers the signal to the duplexer 672. The duplexer 672 transfers the signal from the power amplifier 674 to the antenna 678 for transmission. The antenna 678 transmits the version 566 of the wireless signal 102. The version 566 is a wireless signal that is based on the signal from the duplexer 672. The antenna 678 is configured to transmit the version 566 with a particular polarization. For example, the antenna 678 might transmit the version 566 with a linear right-slant polarization at 45 degrees from vertical.

The antenna 687 receives the wireless signal 102 and transfers the received signal to the duplexer 681. The duplexer 681 transfers the received signal from the antenna 687 to the low-noise amplifier 683. The low-noise amplifier 683 amplifies the signal from the duplexer 681 and transfers the signal to the power amplifier 684. The power amplifier 684 amplifies the signal from the low-noise amplifier 683 and transfers the signal to the duplexer 682. The duplexer 682 transfers the signal from the power amplifier 684 to the antenna 688 for transmission. The antenna 688 transmits the version 568 of the wireless signal 102. The version 568 is a wireless signal that is based on the signal from the duplexer 682. The antenna 688 is configured to transmit the version 568 with a particular polarization. For example, the antenna 688 might transmit the version 568 with a linear left-slant polarization at 45 degrees from vertical.

The antennas 678 and 688 are configured with polarization transmission characteristics based on shape and orientation that transmit wireless signals with different polarizations. The polarization of the version 566 and the antenna 678 are different than the polarization of the version 568 the antenna 688. In some embodiments, the two polarizations are orthogonal to one another. The base station is able to isolate the version 566 from the version 568 based on the difference in polarization. The isolation of the versions 566 and 568 prevents them from interfering with one another to cause fading. If desired, the antennas 678 and 688 may be configured with slightly different directional characteristics to achieve some additional spatial diversity.

The above operation relates to the return link. The repeater system 550 operates in a reciprocal fashion on the forward link for wireless signals that are received by the antennas 678 and 688 and then are transmitted by the antennas 677 and 687. Signals from the antenna 678 pass through the duplexer 672, the low-noise amplifier 676, the power amplifier 675, and the duplexer 671 to reach the antenna 677. Signals from the antenna 688 pass through the duplexer 682, the low-noise amplifier 686, the power amplifier 685, and the duplexer 681 to reach the antenna 687. The use of polarization diversity on the forward link is not required, but is utilized in some embodiments of the invention. In these embodiments, the antennas 677 and 687 are configured to transmit versions of a signal to the communications device 100 using different polarizations in a manner similar to that discussed for antennas 678 and 688.

Figure 7:
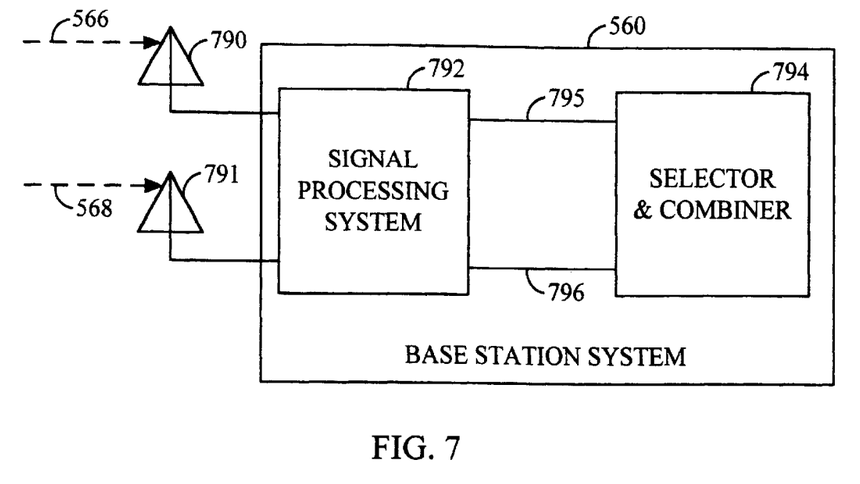
FIG. 7 is a block diagram of a base station system in an embodiment of the invention.
Figure 8:
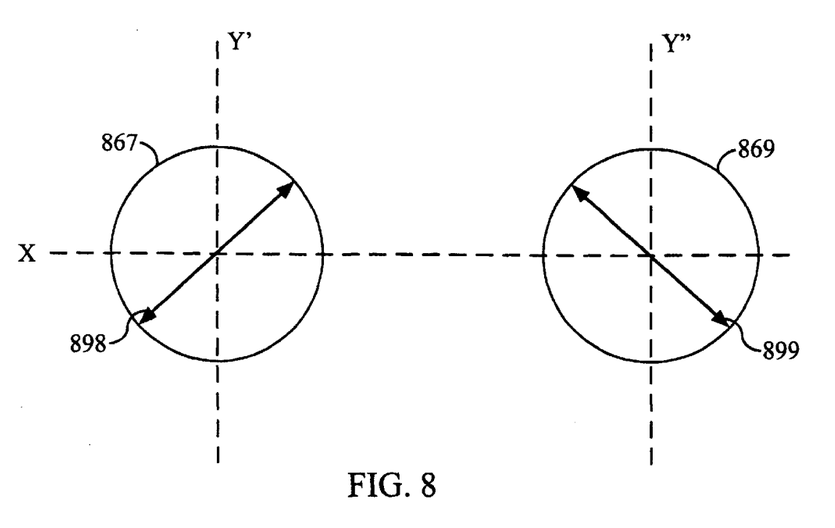
FIG. 8 is a diagram depicting polarization in an embodiment of the invention.

The Base Station System and Polarization—FIGS. 7–8

FIG. 7 depicts the base station system 560. The base station system 560 comprises an antenna 790, an antenna 791, and a receive diversity signal processing system 792. These components are conventional, but they have not been combined to operate in accord with the invention. Those skilled in the art are aware that there are numerous other components and configurations that could be used for the base station system of the present invention, and that the invention is not restricted to the components and configuration depicted on FIG. 7.

In operation, the antenna 790 receives the version 566, and the antenna 791 receives the version 568. The antennas 790 and 791 are configured with polarization reception characteristics based on shape and orientation that separate wireless signals with different polarizations. The antenna 790 is configured to receive wireless signals with the same polarization as the version 566 and to filter out wireless signals with the same polarization as the version 568. The antenna 791 is configured to receive wireless signals with the same polarization as the version 568 and to filter out wireless signals with the same polarization as the version 566. The antennas 790 and 791 provide versions 795 and 796, respectively based on versions 566 and 568, to the receive diversity signal processing system 792. If desired, the antennas 790 and 791 could be integrated into a single antenna structure with two distinct polarization characteristics.

The receive diversity signal processing system 792 processes the versions 795 and 796 from the antennas 790 and 791 to provide a resulting communications signal 114. Processing includes conventional techniques for digitization, down-conversion, and demodulation that may include decoding, de-multiplexing, or filtering. Through polarization diversity, the versions 795 and 796 can be isolated from one another before they are demodulated to reduce interference between the two signals. The resulting communications signal 114 includes the user information carried in the wireless signal 102 transmitted by the user communications device 100.

FIG. 8 depicts two wireless signals 867 and 869 as if they are propagating into the page in a z direction. The wireless signal 867 has a linear 45-degree right-slant polarization 898. The wireless signal 869 has a linear 45-degree left-slant polarization 899. The two polarizations 898 and 899 are orthogonal to one another since there are no components of one in the other. The difference in polarization allows the wireless signals 867 and 869 to be isolated from one another by two antennas if one antenna is configured to receive linear 45 degree right-slant polarization 898 and not the orthogonal linear 45 degree left-slant polarization 899, and if the other antenna is configured to receive linear 45 degree left-slant polarization 899 and not the orthogonal linear 45 degree right-slant polarization 898. Those skilled in the art are aware that there are an infinite number of other combinations of orthogonal polarizations.

The invention typically uses polarization states that are substantially orthogonal to each other as identified by opposite points on the Poincaré Sphere. Thus, it is desired to generate electromagnetic waves that are nearly purely polarized and whose major components fall on opposite points on the Poincaré Sphere.

Figure 9:
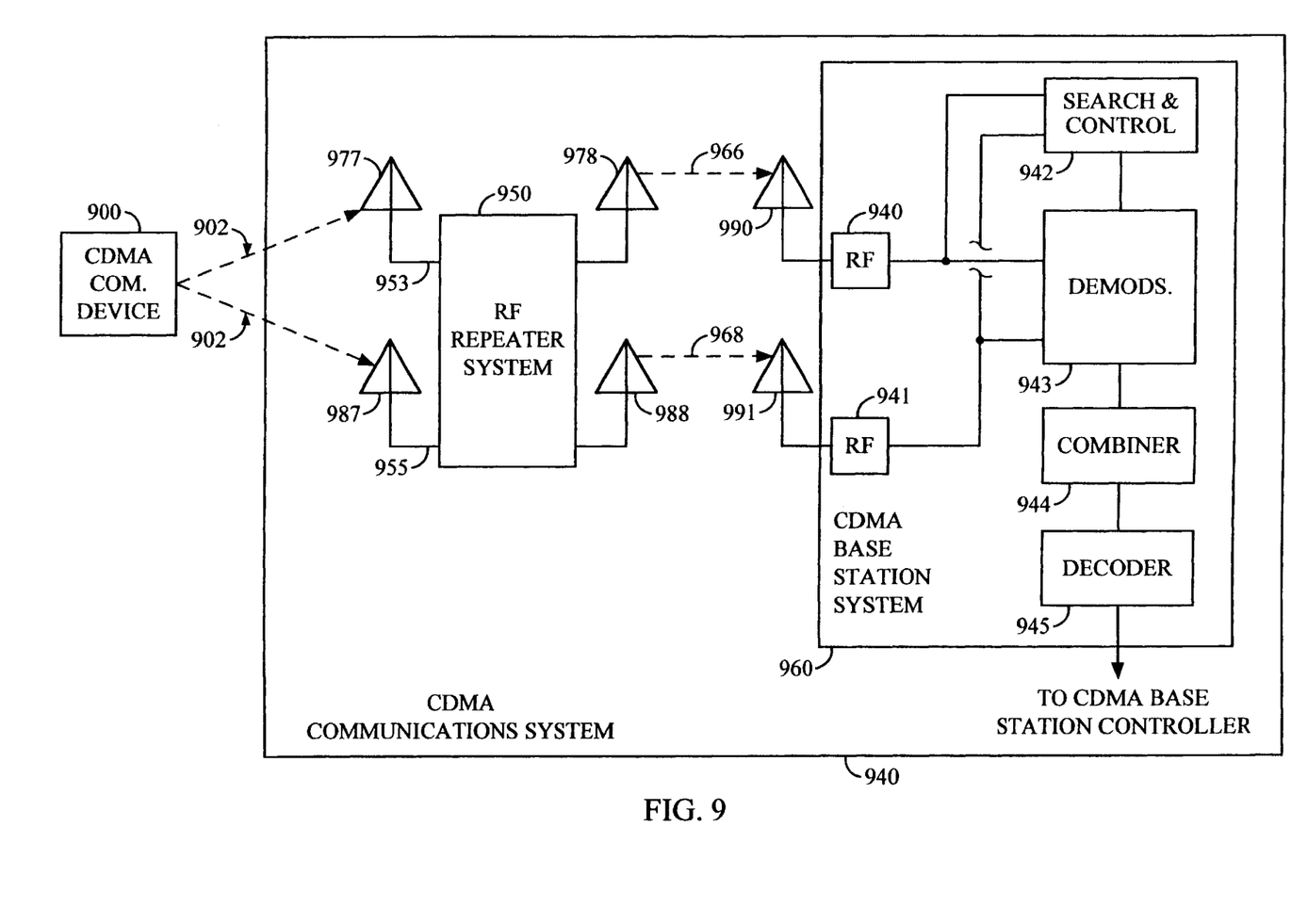
FIG. 9 is a block diagram of a CDMA communications system in an embodiment of the invention.

CDMA System Configuration and Operation—FIG. 9

FIG. 9 depicts a CDMA communications system 930 that is configured and operates in accord with the present invention. The CDMA communications system 930 is comprised of a repeater system 950 and a CDMA base station system 960. The repeater system 950 is operationally coupled to antennas 977, 978, 987, and 988. The CDMA base station system 960 is comprised of receivers 940 and 941, search and control 942, demodulators 943, combiner 944, and decoder 945. The CDMA base station system 960 is operationally coupled to antennas 990 and 991.

The antennas 978, 988, 990, and 991 are configured with polarization characteristics based on shape and orientation that transmit and/or receive CDMA signals with particular polarizations. The polarization characteristic of the antennas 978 and 990 are matched to one another, but are different than the polarization characteristic of the antennas 988 and 991. In some embodiments, the polarization used for the antenna 978, the version 966, and the antenna 990 is orthogonal to the polarization used for the antenna 988, the version 968, and the antenna 991. One example of orthogonal polarization is linear right-slant and left-slant polarization at 45 degrees from the vertical. By using differently polarized antennas, the versions 966 and 968 can be isolated from one another before they are demodulated in the base station 960 to reduce interference between the two signals. If desired, the antennas 978 and 988 or the antennas 990 and 991 could be integrated into a single antenna structure with two distinct polarization characteristics.

The components on FIG. 9 are conventional, but they have not been combined to operate in accord with the invention. Those skilled in the art are aware that there are numerous other components and configurations that could be used for the CDMA communications system 930, and that the invention is not restricted to the components and configuration depicted on FIG. 9.

In operation, the communications device 900 transmits a wireless CDMA signal 902 to the repeater system 950. The repeater system 950 receives a version 953 of the CDMA signal 902 using the antenna 977. The repeater system 950 also receives a version 955 of the CDMA signal 902 using the antenna 987. The repeater system 950 amplifies the version 953 and transfers it to the antenna 978 for transmission. The repeater system 950 also amplifies the version 955 and transfers it to the antenna 988 for transmission. It should be noted that the repeater system 950 does not perform CDMA processing on the versions 953 and 955. The repeater system 950 does not extract the user information from the signals, and it does not convert from the CDMA protocol to another protocol.

The antenna 978 transmits a version 966 of the CDMA signal 902 to the base station 960. The version 966 is a CDMA signal that is based on the version 953 and has a first polarization. The antenna 988 transmits a version 968 of the CDMA signal 902 to the base station 960. The version 968 is a CDMA signal that is based on the version 955 and has a second polarization. The first polarization used in the version 966 is different from the second polarization used in the version 968. In some embodiments, they are orthogonal to one another.

The repeater system 950 operates in a reciprocal fashion for wireless CDMA signals that are received by the antennas 978 and 988 and that are transmitted by the antennas 977 and 987. The use of polarization diversity on the forward link is not required, but is used in some embodiments of the invention. In these embodiments, the antennas 977 and 987 are configured to transmit differently polarized versions of a signal to the communications device 900. The polarized versions could be orthogonal to one another.

The antenna 990 receives CDMA signals with the same polarization as the version 966 and filters out CDMA signals with the same polarization as the version 968. The antenna 991 receives CDMA signals with the same polarization as the version 968 and filters out CDMA signals with the same polarization as the version 966. The antennas 990 and 991 provide the received versions 966 and 968 to the receivers 940 and 941 respectively.

The receivers 940 and 941 down-convert and digitize the received versions 966 and 968. The receivers 940 and 941 provide the signals to both the search and control 942 and the demodulators 943. The search and control 942 uses a Pseudo-random Number (PN) code to detect the arrival times of the various multipath copies of the versions 966 and 968. The arrival times are provided to the demodulators 943 where the multipath copies are identified and processed using the PN code and a Walsh code. The search and control 942 and the demodulators 943 are able to process the versions 966 and 968 independently due to the isolation enabled by the polarization diversity. The demodulators 943 provide soft decision data to the combiner 944 based on the processing of the versions 966 and 968. The combiner combines the soft decision data and provides it to the decoder 945. The combiner 944 decodes the soft decision data, typically with a trellis or Viterbi decoding process, to generate a signal with the user information in the CDMA signal 902 from the CDMA communications device 900. This signal is transferred to the CDMA base station controller.

The components and operations described with respect to FIG. 9 could be adapted from the components and operations described with respect to FIG. 5. Those skilled in the art recognize that the systems depicted in FIGS. 5–9 have been simplified for reasons of clarity, and that such systems include numerous other conventional components.

An antenna system is described in U.S. Pat. No. 5,577,265, entitled "Antenna System For Multi-Path Diversity In An Indoor Microcellular Communication System", by Charles E. Wheatley III, issued on Nov. 19, 1996, assigned to Qualcomm, Inc., and that is hereby incorporated by reference into the present application. A CDMA system is described U.S. patent application Ser. No. 08/941,147, entitled "Polarization Enhanced CDMA Communications System" by Kenneth R. Baker, filed on Sep. 30, 1997, assigned to Qualcomm, Inc., and that is hereby incorporated by reference into the present application. A repeater system using time diversity is described in a United States Patent Application entitled "Wireless Repeater Using Time Diversity In A Wireless Communications System", by Kenneth R. Baker and Richard Dean, filed on the same date as the present application, assigned to Qualcomm, Inc., and that is hereby incorporated by reference into the present application. A repeater system using commutation is described in a United States Patent Application entitled "Wireless Repeater Using Commutation In A Wireless Communications System", by Kenneth R. Baker and Richard Dean, filed on the same date as the present application, assigned to Qualcomm, Inc., and that is hereby incorporated by reference into the present application.

SUMMARY

In a distinct advance in the art, the receive diversity of the wireless repeater system is maintained through to the base station by using different signal polarities to transmit diverse versions of the original wireless signal. The base station isolates these diverse versions of the original wireless signal. The base station then processes these versions in the conventional manner for a diversity receiver to generate a communications signal with the user information transmitted in the original wireless signal.

The repeater does not sum the diverse versions of the wireless signal as in prior systems, but transmits them to the base station using diverse signal polarities. The repeater does not incur the three-decibel SNR loss because it does not sum the diverse versions. The use of two transmitter systems provides reliability in the event that one of the transmitter systems malfunctions. Diverse polarization can also be applied on the forward link to improve transmit diversity to the user communications device. The use of diversely polarized wireless signals improves the diversity of the communications system. The improved diversity reduces fading and lowers signal power requirements. Reduced signal power lowers the cost of the communications device while increasing operational battery life and range.

As mentioned above, signal power poses a concern for CDMA systems since it is directly related to the capacity of the CDMA system. The loss of diversity in a CDMA system typically results in higher signal power requirements that decrease the range of the CDMA system. The invention eliminates the loss of diversity in the repeater that is present in current CDMA systems. The invention increases CDMA system range by improving diversity and lowering the signal power requirements. The additional capacity could be used to handle additional simultaneous calls at a base station.

The cost of maintaining diversity from the repeater through to the base station is the additional transmitter. The cost of the additional transmitter might have prevented the deployment of redundant transmitters in the past, but the increase in CDMA system capacity that is provided by the improved diversity makes the introduction of the additional transmitter especially cost-effective in a CDMA system. The addition of the second transmitter and the use of different wireless signal polarities is estimated to increase the capacity of the typical CDMA base station by approximately 2 dB due to the improved diversity and lower signal power. The use of different polarizations is an effective technique to achieve the improved diversity and corresponding gain in CDMA system capacity.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing wireless communications wherein a communications device transmits a wireless signal containing user information, the method comprising:

receiving a first version of the wireless signal into a repeater system using a first receiver system;

receiving a second version of the wireless signal into the repeater system using a second receiver system;

transmitting a third version of the wireless signal from the repeater system wherein the third version of the wireless signal has a first polarization and is based on the first version of the wireless signal; and transmitting a fourth version of the wireless signal from the repeater system wherein the fourth version of the wireless signal has a second polarization and is based on the second version of the wireless signal, wherein the third version and the fourth version of the wireless signal can be isolated from one another based on the first polarization and the second polarization.

2. The method of claim 1 wherein the first polarization and the second polarization are orthogonal.

3. The method of claim 1 further comprising:

receiving the third version of the wireless signal into a base station system using the first polarization;

receiving the fourth version of the wireless signal into the base station system using the second polarization; and processing the third version of the wireless signal and the fourth version of the wireless signal in the base station system to generate a communications signal containing the user information.

4. The method of claim 3 further comprising transferring the communications signal with the user information to a communications network.

5. The method of claim 1 wherein the wireless signal and the first, second, third, and fourth versions of the wireless signal are Code Division Multiple Access signals.

6. The method of claim 1 further comprising amplifying the first and the second version of the wireless signal in the repeater system.

7. The method of claim 6 wherein the repeater system does not extract user information from the first or the second version of the wireless signal.

8. The method of claim 1 further comprising:

receiving another wireless signal into the repeater system; and transmitting two versions of the other wireless signal from the repeater system to the communications device wherein the two versions of the other wireless signal have different signal polarizations.

9. A system for wireless communications wherein a communications device transmits a wireless signal containing user information, the system comprising:

a repeater system that is operational to receive a first version of the wireless signal using a first receiver system, to receive a second version of the wireless signal using a second receiver system, to transmit a third version of the wireless signal that has a first polarization and is based on the first version of the wireless signal, and to transmit a fourth version of the wireless signal that has a second polarization and is based on the second version of the wireless signal; and a base station system that is operational to receive the third version of the wireless signal using the first polarization, to receive the fourth version of the wireless signal using the second polarization, and to process the third version of the wireless signal and the fourth version of the wireless signal to generate a communications signal containing the user information.

10. The system of claim 9 wherein the first polarization and the second polarization are orthogonal.

11. The system of claim 9 wherein the wireless signal is a Code Division Multiple Access signal.

12. The system of claim 11 wherein the base station system is operational to decode Code Division Multiple Access signals.

13. The system of claim 9 wherein the base station system includes an antenna structure with at least two distinct polarizations.

14. The system of claim 9 wherein the repeater system includes an antenna structure with at least two distinct polarizations.

15. The system of claim 9 wherein the repeater system receives another wireless signal and is operational to transmit two versions of the other wireless signal to the communications device wherein the two versions of the other wireless signal have different signal polarizations.

16. A repeater system for wireless communications wherein a communications device transmits a wireless signal, the repeater system comprising:

a first receiver system that is operational to receive a first version of the wireless signal;

a second receiver system that is operational to receive a second version of the wireless signal;

a first transmitter system that is operationally coupled to the first receiver system and that is operational to transmit a third version of the wireless signal that has a first polarization and is based on the first version of the wireless signal; and a second transmitter system that is operationally coupled to the second receiver system and that is operational to transmit a fourth version of the wireless signal that has a second polarization and is based on the second version of the wireless signal, wherein the third version and the fourth version of the wireless signal can be isolated from one another based on the first polarization and the second polarization.

17. The repeater system of claim 16 wherein the first polarization and the second polarization are orthogonal.

18. The repeater system of claim 16 wherein the repeater system includes an antenna structure with at least two distinct polarizations.

19. The repeater system of claim 16 wherein the wireless signal and the first, second, third, and fourth versions of the wireless signal are Code Division Multiple Access signals.

20. The repeater system of claim 19 wherein the repeater system does not decode the CDMA signals.

21. The repeater system of claim 16 wherein the repeater system is operational to amplify the first and the second version of the wireless signal.

22. The repeater system of claim 16 wherein the repeater system receives another wireless signal and is operational to transmit two versions of the other wireless signal to the communications device wherein the two versions of the other wireless signal have different signal polarizations.

* * * * *